April 24, 1951

W. J. O'BRIEN 2,549,923

VACUUM TUBE OSCILLATOR

Filed Aug. 27, 1945

INVENTOR.
WILLIAM J. O'BRIEN,
BY
Harold W. Mattingly
ATTORNEY.

Patented Apr. 24, 1951 2,549,923

UNITED STATES PATENT OFFICE 2,549,923

VACUUM TUBE OSCILLATOR

William J. O'Brien, London, England, assignor to The Decca Record Company, Limited, London, England, a corporation of Great Britain Application August 27, 1945, Serial No. 612,993

7 Claims. (Cl. 250—36)

Figure 1:
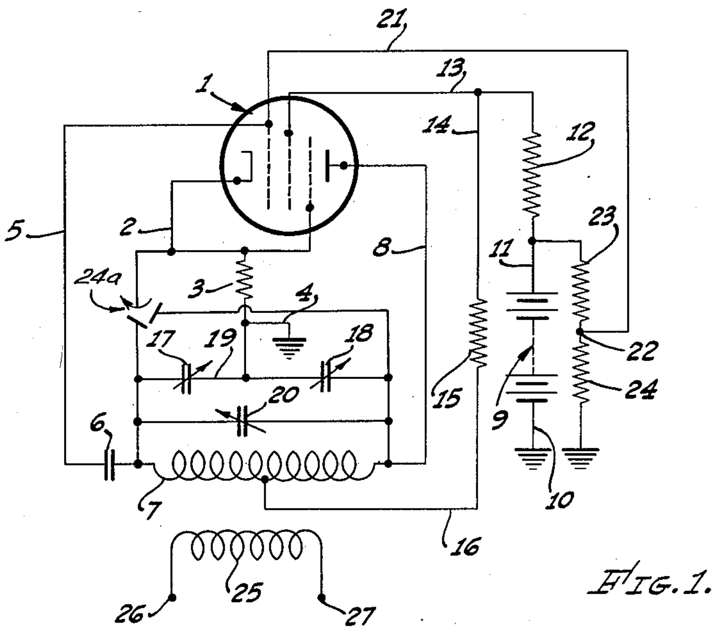

My invention relates to an alternating potential generator and has particular reference to a vacuum tube oscillator having great inherent frequency stability.

In the use of vacuum tube oscillators there is a great need for frequency stability; that is, the property of the oscillator to produce an alternating potential of a fixed and unchanging frequency. A typical example of one of the uses of vacuum tube oscillators under circumstances which require great frequency stability is in the oscillators employed in radio broadcasting systems. Frequency stability is required because the operating carrier frequencies are assigned and government regulations require strict adherence to the assigned frequencies. Furthermore, any shift of the oscillator frequency during operation of the system will produce detuning and a consequent fading of the signals at the receiving end, seriously impairing the quality and entertainment value of the transmitted program. Similarly, frequency stability is required in frequency controlled navigation and beacon systems as the direction of the radio beacon course or the coordinate system laid down by the navigation system is shifted by a change in frequency of the oscillator.

It is the present practice to obtain frequency stability by using the piezo electric effect of a quartz crystal. The range of frequency which may be corrected is, however, limited and as a general proposition temperature control is required since the fundamental frequency of the crystal varies slightly with changes in temperature. One of the principal disadvantages of a crystal oscillator is that no adjustment can be made in the operating frequency of the oscillator. It can be operated at one frequency only and that frequency is dependent entirely upon the dimensions of the crystal. Thus crystal oscillators cannot be used in those types of apparatus where the oscillator frequency may require adjustment.

It is, therefore, an object of my invention to provide a vacuum tube oscillator circuit which provides improved frequency stability and without the use of a crystal control circuit.

It is an additional object of my invention to provide an apparatus of the character set forth which includes a grid to cathode compensating circuit to compensate for changes in oscillator tube reactance resulting from changes in mutual conductance and variations in plate supply potential.

It is still further an object of my invention to provide an oscillator of the character set forth in the preceding paragraph in which the grid to cathode compensating circuit comprises an unbypassed cathode resistor cooperating with an external grid circuit to cathode capacitance.

It is also an object of my invention to provide an oscillator of the character set forth in the preceding paragraph which includes a compensating capacity having a negative temperature-capacity coefficient and connected in parallel with a tuning capacity to compensate for the effects of temperature changes.

Figure 2:
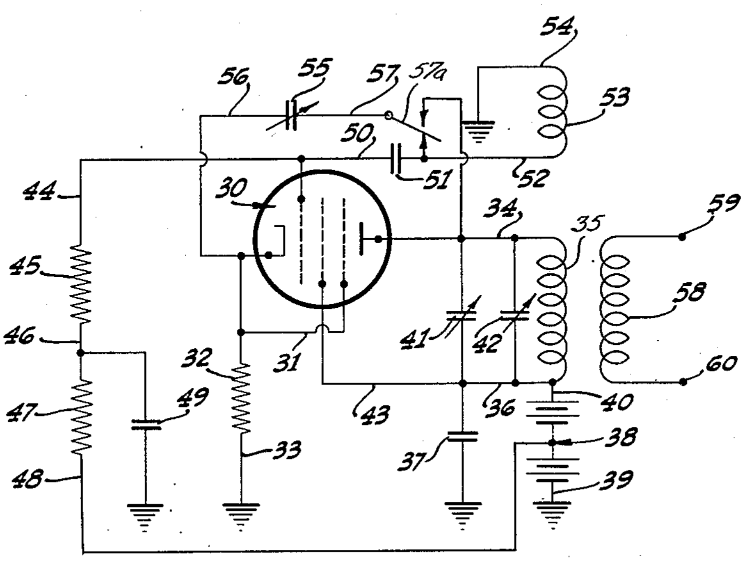

Other objects and advantages of my invention will be apparent from a study of the following specifications, read in connection with the accompanying drawings, wherein:

Fig. 1 is a schematic diagram illustrating a vacuum tube oscillator circuit comprising one form of my invention; and Fig. 2 is a schematic diagram illustrating a vacuum tube oscillator circuit comprising a modified form of the invention.

In the drawings, the heaters or filaments and heater supply connections have been omitted for the purpose of simplification, these connections being well known and not requiring illustration. Similarly, positive operating potential for the anodes of the tubes have been represented as comprising a battery, it being realized that any suitable source of direct potential supply may be employed as, for example, the rectifier filter systems commonly employed in radio transmitting and receiving apparatus.

In Fig. 1 I have illustrated one form of my invention as including a pentode type of vacuum tube 1. The cathode and suppressor grid of the tube 1 are interconnected as by a conductor 2 and connected to ground through a cathode dropping resistance 3 and ground conductor 4.

As is conventional, the cathode circuit is common to the grid and plate circuits of the oscillator, the former comprising a conductor 5 connected to the grid of the tube 1 and connected through a blocking condenser 6 to one end of a tuning coil 7. The opposite end of the tuning coil 7 is connected as by a conductor 8 to the plate of the tube 1.

Positive operating potential for the vacuum tube 1 is obtained from a suitable source of direct current represented diagrammatically in Fig. 1 as comprising a plate battery 9. The negative terminal of the battery is grounded as by a conductor 10 and the positive terminal is connected through a conductor 11, resistance 12 and conductor 13 to the screen grid of the tube 1. A branch circuit from conductor 13 comprising conductor 14, resistance 15 and conductor 16 extends to a mid tap on the coil 7, thus applying positive operating potential to the plate of the tube 1 through the conductor 8.

The tuning coil 7 is tuned to the desired operating frequency by series connected tuning condensers 17 and 18, the condenser 17 being connected to the grid end of the coil 7 and the condenser 18 being connected to the plate end of the coil 7. The common connection between condensers 17 and 18 comprising a conductor 19 is connected to ground through the previously mentioned conductor 4.

I have found that the frequency stability of the oscillator may be improved by using a tuning coil or inductance constructed along the lines disclosed in my copending application Ser. No. 612,994 filed August 27, 1945 and entitled Inductor, now abandoned. Briefly the inductance described therein consists of a honeycomb type of coil made from enamel wire and wound upon a ceramic or porcelain tubular support. By impregnating and baking, the coil structure is formed as a rigid whole minimising changes in inductance and distributed capacity resulting from temperature changes.

In addition to the condensers 17 and 18, the resonant frequency of the tuning circuit is determined by a compensating condenser 20 which is connected in parallel with the coil 7. The condenser 20 is of special construction designed to give the condenser a negative temperature-capacity coefficient; that is, the condenser 20 is so constructed that its capacity will vary with temperature in a direction opposite to that of tuning condensers of conventional construction which are ordinarily considered as having a positive temperature-capacity coefficient. The total capacity of the shunt circuit comprising condensers 17, 18 and 20 is, of course, adjusted with respect to the inductance of the tuning coil 7 to provide a resonant circuit having a resonant frequency equal to the frequency desired to be generated by the oscillator.

The relative capacities of the compensating condenser 20, on the one hand, and the tuning condensers 17 and 18, on the other, are adjusted in terms of their relative temperature-capacity coefficients so that the changes in capacity with temperature in one condenser will exactly offset that of the other tank circuit condensers and inductances. Thus the operating frequency is maintained substantially independent of temperature changes.

The grid of the tube 1 is preferably biased positively with respect to ground as by a conductor 21 which is connected as shown at 22 to a voltage divider circuit comprising resistances 23 and 24 connected in series and across the plate supply battery 9. The tube is operated without a by-pass condenser across the cathode resistance 3. This produces a degenerative effect which serves to improve the wave form and frequency stability of the oscillator. The grid of the tube is operated at a positive potential with respect to ground to permit the use of a relatively high value of cathode resistance 3 to develop the usual negative operating value of grid to cathode bias. A high value of resistance is, by preference, employed for the cathode resistance 3 to permit a relatively large degenerative effect with the accompanying improvement in frequency stability and wave form of the generated signal.

The cathode resistance 3 co-operates with a split stator variable condenser 24a to compensate for changes in the mutual conductance of the tube 1, resulting from variations in plate supply voltage. The rotor of the condenser 24a is connected by a conductor 2 to the cathode of the tube 1, and the stators are connected respectively to opposite ends of the tuning coil 7. Ordinarily changes in plate supply potential alter the space charge in the tube to in effect change the grid to cathode capacity of the tube and vary the mutual conductance. The resulting change in frequency may be either in the same direction as the change in voltage or it may be in the opposite direction, depending upon the character and quality of the tube, the constants of the various circuits and upon other factors, which are not well understood. A capacity connected between conductors 2 and 8 will compensate for a tendency for the frequency to reduce with a reduction in plate supply voltage. A tendency for the frequency to increase with a reduction in voltage is compensated by a capacity connected between the cathode and the grid end of the inductance 7. The use of the split-stator condenser 24a, permits capacity to be added at one point at the same rate as it is reduced at the other, so that the single condenser may be used to compensate for increases or decreases in frequency with a reduction in plate voltage.

The radio frequency voltage across each of the sections of the condenser 24a is equal to one half the radio frequency voltage across the coil 7 less the radio frequency drop in the resistance 3. When the mutual conductance of the tube reduces in response to a reduction in plate supply voltage, the radio frequency drop across the resistance 3 similarly reduces so as to increase the voltage across condenser 24a. This causes the condenser to draw a higher load current as its reactance is constant and the effect is the same as if the radio frequency voltage were kept constant and the capacity of the condenser increased. The effect then is the same as increasing or decreasing the capacity of the tuned circuit to thereby change the tuning of the resonant circuit. The value of the capacity is not critical and is ordinarily determined empirically because the factors causing poor frequency regulation with plate supply voltage changes are not well understood and cannot be accurately predicted.

The oscillator may be coupled inductively if desired to any suitable load as by providing a coupling coil 25 inductively coupled to the tuning inductance 7 and terminating in terminals 26 and 27 to which the load may be connected.

I have illustrated in Fig. 2 a modified form of the invention. In the form of invention shown in Fig. 2, a pentode type oscillator tube 30 is employed. The cathode and suppressor grid of the tube 30 are interconnected as by a conductor 31 and are connected to ground through a cathode resistance 32 and conductor 33. The plate of the tube 30 is connected in a resonant plate circuit comprising conductor 33, tuning coil 35, conductor 36 and by-pass condenser 37, the latter being connected between conductor 36 and ground.

Operating potential for the plate is obtained from a suitable source of direct current represented in Fig. 2 as comprising a plate battery 38, the negative terminal of which is grounded as by a conductor 39 and the positive terminal of which is connected to the conductor 36 as by a conductor 40. The tuning coil 35 is tuned to the desired frequency by a tuning condenser 41 and a compensating condenser 42, both of which are connected in parallel with the coil 35. The conductor 36 is also extended by way of conductor 43 to the screen grid of the tube 30 to apply operating potential to that grid.

The tuning condenser 41 and the compensating condenser 42 are arranged to have opposite temperature-capacity coefficients in the manner described in connection with Fig. 1 to thereby render the resonant frequency of the plate circuit substantially independent of changes in temperature. The grid of the tube 30 is connected to a positive potential relative to ground through a conductor 44, a resistance 45, a conductor 46, another resistance 47 and a conductor 48 connected to a tap on the battery 38. A bypass condenser 49 is connected between conductor 46 and ground. A positive potential is applied to the grid for the reasons already stated in connection with Fig. 1. The resistance 47 and condenser 49 act as a filter to take out noise originating in the plate supply equipment and to prevent stray feed-back.

The grid of the tube is excited through an excitation circuit which includes a conductor 50, a blocking or coupling condenser 51 and a conductor 52 connected to a pick-up coil 53 which is inductively coupled to the main tuning coil 35, the opposite terminal of the pick-up coil 53 is grounded as by a conductor 54.

To further improve the frequency-stability of the oscillator, a reactance compensating circuit is employed which comprises a condenser 55 connected by means of conductors 56 and 57 and switch 57*a* between the grid end of the pick-up coil 53 and the cathode of the tube 30.

The condenser 55 cooperates with the cathode resistance 32 in a manner similar to that described in connection with the form of the invention shown in Fig. 1 as regards the left hand section of the condenser 24*a*. In the event the frequency shift is in the opposite direction, the condenser 55 should be connected between the cathode and the plate. This may be effected by throwing the switch 57*a* to the position alternate to that shown in Fig. 2 to connect conductor 57 to conductor 34. The proper connection and value of condenser will be determined empirically as has been described.

The signal which is generated by the oscillator may be applied to any desired load through the use of a coupling coil 58 inductively coupled to the tuning coil 35, and which is connected to output terminals 59 and 60 permitting connection of the desired load.

From the foregoing it will be observed that I have provided a vacuum tube oscillator circuit which has high inherent frequency stability. This stability is obtained through the use of an unby-passed cathode resistance of high ohmic value operating with a compensating condenser. The use of negative temperature coefficient condensers as part of the tuning capacity further improves the frequency stability.

While I have shown and described the preferred embodiments of my invention I do not desire to be limited to any of the details of construction shown or described herein except as defined in the appended claims.

I claim:

1. In a signal generator, the combination of: a vacuum tube having a grid, a cathode and a plate; an unby-passed resistance in series with said cathode; an output circuit including said cathode and said plate; an input circuit including said cathode and said grid; a coupling circuit intercoupling said input and output circuits; and a compensating circuit comprising a condenser having two terminals, one of said terminals being directly connected to said cathode and the other of said terminals being connected to coupling circuit.

2. In a signal generator, the combination of: a vacuum tube having a grid, a cathode and a plate; an output circuit including said cathode and said plate; an input circuit including said cathode and said grid; a coupling circuit intercoupling said input and output circuits; a compensating circuit comprising a capacity connecting said cathode to said coupling circuit; and a resonant circuit included in said output circuit, said resonant circuit consisting of an inductance, a tuning condenser having a positive temperature-capacity coefficient, and a compensating condenser having a negative temperature-capacity coefficient and a capacity sufficient to compensate for capacity and inductance changes in said resonant circuit resulting from changes in temperature.

3. In a signal generator, the combination of: a vacuum tube having a grid, a cathode and a plate; an output circuit including a resonant circuit and said cathode and said plate; an input circuit coupled to said output circuit and including said cathode and said grid; a bias means for applying to said grid a positive direct potential; and a cathode resistance connected in series with said cathode and having an ohmic value sufficiently high to produce a negative direct potential as measured from said grid to said cathode.

4. In a signal generator, the combination of: a vacuum tube having a grid, a cathode and a plate; an output circuit including a resonant circuit and said cathode and said plate; an input circuit coupled to said output circuit and including said cathode and said grid; a bias means for applying to said grid a positive direct potential; a cathode resistance connected in series with said cathode and having an ohmic value sufficiently high to produce a negative direct potential as measured from said grid to said cathode; and a condenser connected between said cathode and one of said circuits.

5. In a signal generator, the combination of: a vacuum tube having a grid, a cathode and a plate; an output circuit including a resonant circuit and said cathode and said plate; an input circuit coupled to said output circuit and including said cathode and said grid; a bias means for applying to said grid a positive direct potential; a cathode resistance connected in series with said cathode and having an ohmic value sufficiently high to produce a negative direct potential as measured from said grid to said cathode; a split stator variable condenser having the rotor connected to said cathode; and circuits connecting said stators respectively to said input and said output circuits.

6. In a signal generator including a vacuum tube having a grid and a cathode connected in an input circuit and having a plate connected in an output circuit with said cathode, a reactance compensating circuit comprising an unby-passed resistance of high ohmic value connected in series with said cathode and common to both of said circuits, and a condenser having two terminals, one of said terminals being connected directly to said cathode and the other of said terminals being connected to one of said circuits.

7. In a signal generator, the combination of:

a vacuum tube having a grid, a cathode and a plate; an output circuit including said cathode and said plate; an input circuit including said cathode and said grid; a coupling circuit intercoupling said input and output circuits; a compensating circuit comprising a capacity connecting said cathode to said coupling circuit; and a resonant circuit included in said output circuit, said resonant circuit consisting of an inductance formed as a honeycomb coil of enamel wire having the turns thereof adhesively secured to each other with a baked insulating compound of the group consisting of shellac and varnish, a tuning condenser having a positive temperature-capacity coefficient, and a compensating condenser having a negative temperature-capacity coefficient and a capacity sufficient to compensate for capacity and inductance changes in said resonant circuit resulting from changes in temperature.

WILLIAM J. O'BRIEN.

REFERENCES CITED

The following references are of record in the file of this patent:

UNITED STATES PATENTS

| Number | Name | Date |
|---|---|---|
| 2,027,521 | Drake | Jan. 14, 1936 |
| 2,151,752 | Ellis | Mar. 28, 1939 |
| 2,245,718 | Roberts | June 17, 1941 |
| 2,281,461 | Smith | Apr. 28, 1942 |

FOREIGN PATENTS

| Number | Country | Date |
|---|---|---|
| 436,056 | Great Britain | Oct. 3, 1935 |